March 7, 1961  G. M. ADAMS  2,974,057
PRINTED PLASTIC FILMS
Filed June 10, 1959

INVENTOR.
GEORGE M. ADAMS
BY Elmer J. Fischer

ATTORNEY

United States Patent Office 2,974,057
Patented Mar. 7, 1961

2,974,057
PRINTED PLASTIC FILMS

George M. Adams, Palos Heights, Ill., assignor to Union Carbide Corporation, a corporation of New York Filed June 10, 1959, Ser. No. 819,442

8 Claims. (Cl. 117—12)

This invention relates to a method of printing film and the printed film produced thereby. More particularly, it relates to a method of preventing offset and blocking of ink prints on plasticized polyvinyl film.

Plasticized polyvinyl films, such as plasticized polyvinyl chloride films, either in the form of tubing or sheeting are used extensively for packaging of various materials, especially food products including meat, cheese and oleomargarine. Accordingly, it is often desirable to print such films for decorative effect or to convey informational matter. The flexographic printing process which utilizes inks of low viscosity composed essentially of suitable pigments, a volatile solvent, and resinous binders is commonly employed for such purposes.

However, the resulting print on the plasticized film shows a tendency to remain slightly tacky, causing blocking or adherence of superimposed layers of film, and offsetting or print transfer of the printed surface when the film is stacked or reeled. The inability of printed matter on plasticized polyvinyl chloride film to dry completely is believed to be due in part to migration of the plasticizer from the film into the ink, and possibly the retention of the volatile solvent by the ink and the film even after the usual period of drying.

An object of this invention is to produce a plasticized polyvinyl film from the class including polyvinyl chloride polymers with non-offsetting printed matter thereon.

Another object of this invention is to produce a plasticized polyvinyl chloride film with non-blocking printed matter thereon.

Still another object of this invention is to provide a new and improved coating for printed matter on a plasticized polyvinyl chloride film.

A further object of this invention is to prevent cracking, blushing or distortion of the print or film.

Figure 1:
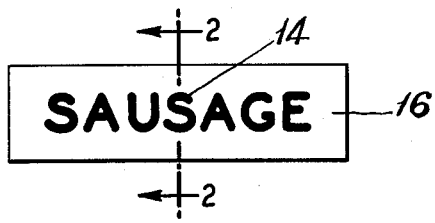
Figure 2:
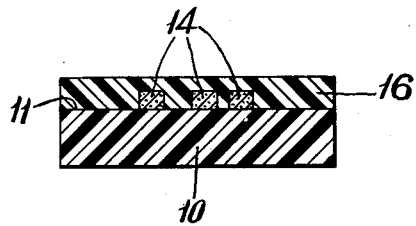

Further objects of this invention will become obvious from the following description and drawings in which:

Figure 1 is a plane view, greatly enlarged for convenience, of a film with printed matter thereon embodying one form of the invention and, Figure 2 is an enlarged cross section of Figure 1, taken along the lines 2—2, looking in the direction of the arrows.

Referring to the drawings, the film 10 is self supporting and essentially consists of a plasticized polyvinyl chloride polymer. Printed on a surface 11 of the film 10 is a flexographic ink 14 with at least the printed matter being overlaid with a coating 16.

The coating 16 after drying is adapted to prevent print offset and blocking when the printed surface 11 of the film 10 is in contact with another surface, such as the surface of another plasticized polyvinyl chloride film. It was found that a coating 16 highly effective for these purposes essentially consists of a compatible solution of a cellulosic polymer and a normally solid acrylate homopolymer or copolymer in a solvent mixture consisting essentially of a volatile lower aliphatic monohydric alcohol, and a member selected from the class consisting of the nitroalkanes and the volatile alkyl ester of a monohydric aliphatic alcohol and a monocarboxylic aliphatic acid and preferably having a boiling point not in excess of about 135° C.

Coatings of cellulosic polymers per se such as cellulose acetate butyrate, are quite hard and very resistant to blocking, but they do not satisfactorily adhere to highly plasticized films, especially those of the polyvinyl chloride type. As a consequence, if such coated films are stretched, cracking, blushing or distortion of the coated print or film will result. However, it was found by incorporating a sufficient quantity of an acrylate polymer with the cellulosic polymer in the coating solution the coating 16 satisfactorily adhered to the film 10, thereby eliminating the immediately foregoing detrimental effects to the print 14 or the film 10.

The cellulosic polymers which can be used include cellulosic esters such as cellulose acetate-butyrate, cellulose acetate, nitro cellulose and cellulose acetate-propionate and cellulose ethers such as ethyl cellulose. Correspondingly the acrylate polymers which can be used include solid homopolymers of the lower acrylate esters, such as methyl methacrylate, ethyl methacrylate, propyl methacrylate, isobutyl methacrylate, copolymers of such monomers such as the copolymer of methyl acrylate and ethyl acrylate, and copolymers of an acrylate ester and such monomers as butadiene, styrene and acrylonitrile.

It is prefered that the weight ratio of cellulosic polymer to acrylate polymer in the coating solution be maintained between about 60 to 75% by weight of the total polymer content with respectively 40 to 25% by weight of acrylate polymer. This preference is predicated on the fact that when the amount of the cellulosic polymer of the coating 16 exceeded about 75% by weight of the total coating solids, the coating tended to have poor adhesion to the film 10. Also, when the cellulosic polymer of the coating 16 is present in amounts less than about 60% by weight of the total coating solids blocking and offsetting of the imprinted film 10 occurred.

The monohydric aliphatic alcohols suitable for the solvent mixture include ethyl alcohol, n-propyl alcohol and isopropyl alcohol. Higher boiling alcohols than the aforementioned are less desirable because of their slower rate of evaporation.

Nitromethane is the preferred nitroalkane solvent due to its rapid evaporation. Higher nitroalkanes such as nitroethane and nitropropane are undesirable because of their slower evaporation rate and undesirable solvent retention in the plasticized polyvinyl chloride film.

Of the alkyl esters, good coating performance and maximum reduction of ink-offset and/or blocking is obtained by employing esters having a boiling point below 135° C. As for example, ethyl acetate, n-butyl acetate, isobutyl acetate, normal propyl acetate, isopropyl acetate, methyl propionate and ethyl propionate.

The weight ratio of alcohol to the ester or nitroalkane can vary between about 25 to 100% ester or nitroalkane and respectively 75 to 0% by weight of alcohol. It is preferred that the weight ratio be maintained about 25 to 35% of ester or nitroalkane and respectively about 75 to 65% by weight of the alcohol. This preference is predicated on the fact that percentages of alcohol in excess of about 75% by weight of the total solvent result in solvent mixtures which do not appear to completely dissolve the combination of cellulosic polymer and acrylate polymer. Also, ester or nitroalkane solvent concentrations in excess of 35% by weight of the total solvent tend to increase the odor in the film 10.

As hereinbefore mentioned, the film 10 is preferably composed of a plasticized polyvinyl chloride polymer. By way of illustration, but not limitation, the term polyvinyl chloride polymer includes polyvinyl chloride homopolymers and copolymers containing a major amount of vinyl chloride and a minor amount of vinyl acetate. The term plasticizer includes plasticizers conventionally used in polyvinyl chloride resins. Among those employed are the monomeric esters such as the phthalate esters, e.g., dioctyl phthalate; esters of straight-chain dibasic acids such as dioctyl adipate and dioctyl sebacate; and phosphate esters such as tricresyl phosphate and trioctyl phosphate. Polymeric esters are also used as plasticizers either in admixture with a monomeric ester or as the sole plasticizers. Conventional polymeric ester plasticizers include polypropylene glycol sebacate, polypropylene glycol adipate, butadiene-acrylonitrile copolymers and epoxidized fatty oils such as epoxidized soya oil.

The details and manner of practicing this invention will become apparent by reference to the following specific examples, it being understood that these examples are merely illustrative embodiments of the invention and that the scope of the invention is not limited thereto.

*Example I*

Continuous lengths of plasticized polyvinyl chloride film 10 were fed through a flexographic press of a conventional type wherein the film 10 was imprinted with a flexographic ink 14 on the surface 11 thereof. The printed surface 11 preferably after it has been partially dried such that if desired it could be overprinted with another ink, was then overlayed by rolling thereon a coating 16 of the following composition:

|  | Parts by weight |
|---|---|
| Cellulose acetate butyrate | 177 |
| Solid ethyl acrylate polymer | 88 |
| Isopropyl alcohol (99%) | 865 |
| Isopropyl acetate (95%) | 365 |
| N,N-ethylene bis stearamide | 5 |
|  | 1500 |

The printed and coated film 10 was then passed through a hot dryer wherein the film 10 was exposed to temperatures of 140 to 195° F. of periods of 2 to 10 seconds to flash off the solvents.

The composition of the plasticized polyvinyl chloride film is as follows:

|  | Parts by weight |
|---|---|
| Polyvinyl chloride resin | 100 |
| Dioctyl phthalate | 25 |
| Octyl diphenyl phosphate | 17 |
| Barium-cadmium laurate (stabilizer) | 2.25 |
| Epoxidized triglyceride (plasticizer) | 7 |
|  | 151.25 |

The composition of the ink 14 is as follows:

|  | Percent by weight |
|---|---|
| Titanium dioxide | 47 |
| Polyvinyl chloride acetate | 6 |
| Ethyl acrylate (polymer) | 6 |
| 2-nitropropane | 41 |
|  | 100 |

*Example II*

Continuous lengths of film 10 were printed with the flexographic ink 14 and overlayed with a coating 16 as set forth in Example I. Both the film 10 and the ink 14 were the same as set forth in Example I, however, the composition of the coating 16 differed from that of the coating employed in Example I being of the following composition:

|  | Parts by weight |
|---|---|
| Cellulose acetate butyrate polymer | 177 |
| Solid ethyl acrylate polymer | 88 |
| Isopropyl alcohol | 865 |
| Nitromethane | 365 |
| N,N' ethylene bis stearamide | 5 |
|  | 1500 |

After the coating of the immediately foregoing composition was applied, the printed and coated film 10 was dried in the manner set forth in Example I.

It is to be noted that the N,N' ethylene bis stearamide used in the foregoing Examples I and II is not essential, but assists the cellulose acetate butyrate in preventing blocking and also improves the slip properties of the film.

The cellulose acetate butyrate employed in the foregoing examples has a 37% butyryl and 13% acetyl content with a viscosity of 1.12 to 1.18 poises as determined by the ASTM method D-1343-54T.

The coating employed in the foregoing examples was prepared by measuring out the cellulose acetate butyrate and then added to isopropyl alcohol with continual stirring. Thereafter N,N' ethylene bis stearamide was added to the mixture and stirring was continued until a satisfactory dispersion was obtained. Next the isopropyl acetate (or the nitromethane) was added to the mixture with stirring, followed by the gradual addition of the acrylate polymer to assure complete solution of the polymer.

To determine the blocking and offsetting resistance of the printed and coated films of Examples I and II, they were subject to the following test. The coated film 10 was folded to give a coating to coating and coating to film contact. This resulting "sandwich" was placed under a weight of 1½ p.s.i. in an oven at 49° C. for 24 hours. Thereafter the contacting surfaces were cooled and then separated. The films of Examples I and II exhibited no blocking or print offsetting. Further, such films had good gloss, satisfactory adhesion and were essentially free of residual odor.

To contrast the success of the films of Examples I and II, a plasticized polyvinyl chloride film was printed with a flexographic ink, but was not overlayed with a coating. This film and ink had the same composition as those utilized in Examples I and II. After the ink had dried the printed but not coated film was subjected to the test given the films of Examples I and II. Such film exhibited the detrimental features of offsetting and blocking which are eliminated by this invention.

It is to be understood that various changes and modifications can be made in the above description without departing from the spirit of the invention as set forth in the appended claims.

What is claimed is:

1. A clear coating solution suitable for preventing offsetting and blocking of ink prints on a plasticized polyvinyl chloride film, said coating solution consisting essentially of a cellulosic polymer and a normally solid acrylate polymer in a solvent mixture of a monohydric aliphatic alcohol and a member selected from the class consisting of the nitroalkanes, and alkyl esters of a monohydric aliphatic alcohol and a monocarboxylic aliphatic acid, said cellulosic polymer constituting 60 to 75% of the total polymeric content.

2. The coating solution as set forth in claim 1 wherein the solvent mixture essentially consists of about 65 to 75% by weight of the total solvent of the monohydric aliphatic alcohol and respectively from about 35 to 25% by weight of the member selected from the class consisting of nitroalkanes and alkyl esters of a monohydric aliphatic alcohol and a monocarboxylic aliphatic acid.

3. The coating solution as set forth in claim 1 wherein the monohydric aliphatic alcohol is selected from the class consisting of ethyl alcohol, n-propyl alcohol and isopropyl alcohol.

4. The coating solution as set forth in claim 3 wherein the nitroalkane is nitromethane and the ester has a boiling point not in excess of 135° C.

5. A coated product including a self-supporting film of a plasticized polyvinyl chloride polymer, a flexographic ink printed on a surface of said film, and a clear coating at least over said ink and on said surface adapted to prevent offsetting and blocking of the ink prints on said film, said coating consisting essentially of from 60 to 75% by weight of a cellulosic polymer and respectively 40 to 25% by weight of an acrylate polymer.

6. The product as set forth in claim 5 in which the cellulosic polymer is cellulose acetate-butyrate and the acrylate polymer is a polymer of ethyl acrylate.

7. A coated product including a self-supporting film of a plasticized polyvinyl chloride polymer, a flexographic ink printed on a surface of said film, and a clear coating at least over said ink adapted to prevent offset and blocking of the ink prints on said film, said coating containing about 60 to 75% by weight of a cellulosic polymer selected from the class consisting of cellulose acetate butyrate, cellulose acetate, ethlycellulose, nitro cellulose and cellulose acetate-propionate and respectively from about 40 to 25% by weight of an acrylate polymer selected from the class consisting of methyl methacrylate polymer, ethyl methacrylate polymer, propyl methacrylate polymer, isobutyl methacrylate polymer, methyl acrylate-ethyl acrylate copolymer, and copolymers of an acrylate ester and a monomer selected from the class consisting of butadiene, styrene and acrylonitrile.

8. A method for preventing offsetting and blocking of ink prints on plasticized self-supporting polyvinyl chloride films, comprising the steps of printing a surface of said film with a flexographic ink, applying a clear coating solution at least over said printing, said coating consisting essentially of a solution of a cellulosic polymer and an acrylate polymer in a solvent mixture consisting of a monohydric aliphatic alcohol and a member selected from the class consisting of the nitroalkanes and alkyl esters of a monohydric aliphatic alcohol and a monocarboxylic aliphatic acid, said cellulosic polymer consists of 60 to 75% of the total polymeric content, and thereafter drying the coated film.

References Cited in the file of this patent

UNITED STATES PATENTS

| | | |
|---|---|---|
| 2,073,796 | Hemming | Mar. 16, 1937 |
| 2,320,533 | Muskat et al. | June 1, 1943 |
| 2,652,339 | Yaeger | Sept. 15, 1953 |
| 2,702,255 | Yaeger | Feb. 15, 1955 |